United States Patent [19]

Thomas

[11] Patent Number: 4,642,744
[45] Date of Patent: Feb. 10, 1987

[54] REGULATED HIGH VOLTAGE SUPPLY
[75] Inventor: Wayne D. Thomas, Tigard, Oreg.
[73] Assignee: Tektronix, Inc., Beaverton, Oreg.
[21] Appl. No.: 674,887
[22] Filed: Nov. 26, 1984
[51] Int. Cl.$^4$ .......................................... H02M 3/335
[52] U.S. Cl. ........................................ 363/21; 363/97; 358/190
[58] Field of Search .................... 363/20, 21, 86, 89, 363/97; 323/267; 315/411; 358/190

[56] References Cited
U.S. PATENT DOCUMENTS 3,569,818  3/1971  Dahlinger et al. ................ 363/21
4,419,723  12/1983  Wilson, Jr. .......................... 363/21
4,447,866  5/1984  Reeves ............................... 363/21

Primary Examiner—Peter S. Wong
Attorney, Agent, or Firm—Francis I. Gray; John P. Dellett; Robert S. Hulse

[57] ABSTRACT

A regulated high voltage supply derives two regulated high voltages from a single winding of a transformer. The higher voltage supply is primary side pass regulated, and the lower voltage supply is secondary side offset regulated. The two regulating circuits for the two regulated high voltage supplies interact with each other to correct an error in either high voltage supply.

6 Claims, 2 Drawing Figures

REGULATED HIGH VOLTAGE SUPPLY

BACKGROUND OF THE INVENTION

1. Field of the Invention

The present invention relates to high voltage supplies, and more particularly to more than one regulated high voltage supply from a single high voltage winding of a transformer.

2. Description of the Prior Art

The use of a flyback transformer to produce a single high voltage output for the anode of a cathode ray tube is well-established. However, for special requirements, such as for dynamic focusing as described in co-pending United States patent application, Ser. No. 614,613 entitled "CRT Astigmatism Correction Apparatus with Stored Correction Values" filed May 29, 1984 by Conrad J. Odenthal and Barry A. McKibben, a regulated intermediate high voltage supply is desired. Merely adding a second flyback transformer high voltage supply has the disadvantage of increased space requirements as well as increased cost.

SUMMARY OF THE INVENTION

Accordingly, the present invention provides a regulated high voltage supply which derives two regulated high voltages from a single high voltage winding of a transformer. The higher voltage supply is primary side pass regulated, and the lower voltage supply is secondary side offset regulated. The two regulating circuits for the two regulated high voltage supplies interact with each other to correct an error in either high voltage supply.

Therefore, it is an object of the present invention to provide two regulated high voltage supplies using a single transformer.

Other objects, advantages and novel features will be apparent from the following detailed description when read in conjunction with the appended claims and attached drawing.

DESCRIPTION OF THE PREFERRED EMBODIMENT

Figure 1:
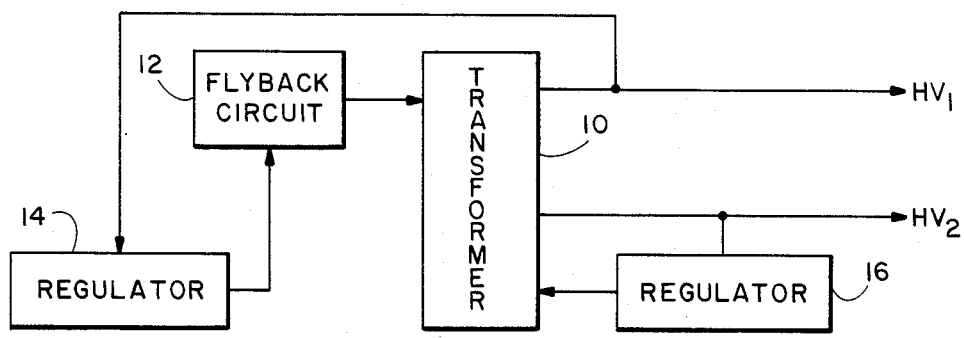
FIG. 1 is a block diagram of a regulated high voltage supply according to the present invention.

Referring now to FIG. 1 a high voltage transformer 10 is energized by a flyback circuit 12 to produce a first high voltage output $HV_1$. $HV_1$ is sampled by a first regulator circuit 14 and an error signal, if any, from the first regulator circuit adjusts the drive of the flyback circuit 12 to correct for such fluctuations of $HV_1$. A second high voltage output $HV_2$ is taken off a tap of the high voltage transformer 10, $HV_2$ is sampled by a second regulator circuit 16 and an error signal, if any, changes the voltage at the lower end of the secondary of the high voltage transformer 10 to correct for such fluctuations in $HV_2$. The change in the lower end of the secondary of transformer 10 affects $HV_1$ which is regulated by the first regulator circuit 14. Thus, the two regulating circuits 14, 16 interact to regulate any fluctuations in either $HV_1$ or $HV_2$.

Figure 2:
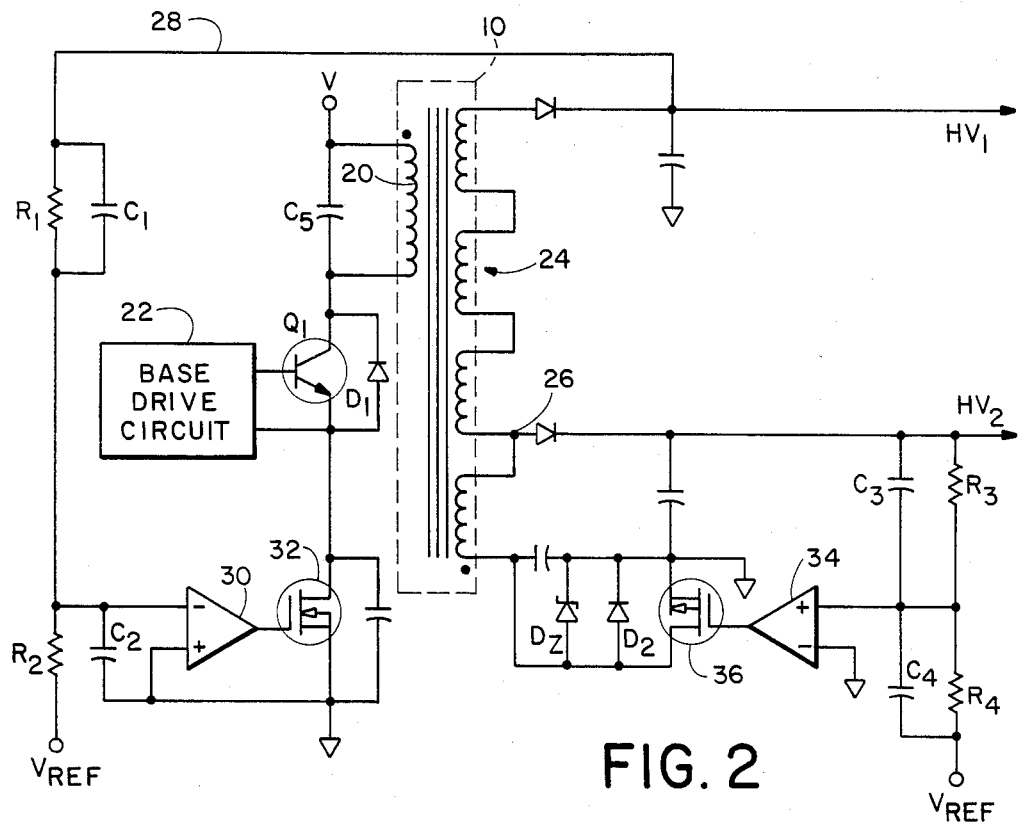
FIG. 2 is a schematic diagram of an embodiment of the regulated high voltage supply of FIG. 1.

As shown in further detail in FIG. 2 the flyback circuit 12 is composed of the primary 20 of the transformer 10, capacitor $C_5$ connected across the primary and at one end to a voltage V, a switch transistor $Q_1$ connected to the other end of capacitor $C_5$, a catch diode $D_1$ connected across the collector to emitter of $Q_1$, and a base drive circuit 22 to drive $Q_1$. The secondary 24 of the transformer 10 is a plurality of windings connected in series, with $HV_1$ at the top of the secondary and $HV_2$ at an intermediate tap 26.

A sample of $HV_1$ is picked off by line 28 and is passed to the inverting input of a first error amplifier 30 via a first attenuator network of $R_1$-$C_1$ and $R_2$-$C_2$. The noninverting input of the error amplifier 30 is grounded. The output of the error amplifier 30 is input to the gate of a first field effect transistor (FET) 32. The source and drain of FET 32 are connected between the switch transistor $Q_1$ and ground.

A sample of $HV_2$ is picked off via a second attenuator circuit $R_3$-$C_3$ and $R_4$-$C_4$ and passed to the noninverting input of a second error amplifier 34. The inverting input of the error amplifier 34 is grounded. The output of the error amplifier 34 is input to the gate of a second FET 36. The source and drain of FET 36 are connected between the bottom of the secondary 24 and ground. Diodes $D_2$ and $D_z$ (a Zener diode) limit the voltage at the bottom of the secondary 24 to between approximately ground and the Zener voltage of $D_z$.

In operation a positive error in $HV_2$ causes the input of the second error amplifier 34 to go positive. The output of the error amplifier 34 is positive driving the output of FET 36, and thus the bottom of the secondary 24, negative. With the bottom of the secondary 24 going negative, $HV_1$ decreases, a negative fluctuation. This negative error is input to the first error amplifier 30 to produce a positive output to FET 32. The output of FET 32 goes negative increasing the voltage across switching transistor $Q_1$ to drive it harder, restoring $HV_1$. This introduces a smaller positive error to $HV_2$ and the loop continues until $HV_1$ and $HV_2$ are restored to their respective regulated values.

As an example assume that $HV_1$ is 19.5 kV regulated and $HV_2$ is nominally 3.5 kV, but is actually 300 volts high. The amplifier 34/FET 36 loop will lower the bottom of the secondary 24 by 300 volts, thus correcting the 3.5 kV supply error and lowering the 19.5 kV supply to 19.2 kV. The amplifier 30/FET 32 loop increases the voltage to switching transistor $Q_1$ by the ratio of 19.5/19.2, reestablishing the 19.5 kV supply and causing a new error in the 3.5 kV supply of the 19.5/19.2 ratio or 56 volts. Both loops repeat the correction step for a new 3.5 kV error at 10 volts, then two volts, and then about 0.3 volts error. Thus, a 300 volt initial error in the 3.5 kV supply requires approximately 368 volts of movement at the bottom of the secondary 24 to regulate the output.

Thus the present invention provides a high voltage supply with two regulated high voltages from a single high voltage secondary of a transformer. Although the invention is described in terms of a flyback transformer, those skilled in the art will recognize that the present invention applies equally well to other power supply topologies.

What is claimed is:

1. A regulated high voltage supply comprising:
   means for generating a first and a second high voltage output, said generating means including a primary circuit, and a secondary circuit having a secondary winding wherein said first and second high voltage outputs are provided from the same said secondary winding;

first means for pass regulating said first high voltage output in the primary circuit; and second means for offset regulating said second high voltage output in the secondary circuit including means for providing a reference voltage for a terminal of said secondary winding, said first and second regulating means interacting with each other to correct for fluctuations in said first and second high voltage outputs.

2. A regulated high voltage supply as recited in claim 1 wherein said first regulating means comprises:

first means for sampling said first high voltage output, said first high voltage output having a higher voltage than said second high voltage output;

first means for detecting fluctuations in said sampled first high voltage output to generate a first error signal; and first means responsive to said first error signal for correcting said first high voltage output for said fluctuations.

3. A regulated high voltage supply as recited in claim 2 wherein said second regulating means comprises:

second means for sampling said second high voltage output;

second means for detecting fluctuations in said sampled second high voltage output to generate a second error signal; and second means responsive to said second error signal for correcting said second high voltage output for said fluctuations by setting said reference voltage for said secondary winding.

4. A regulated high voltage supply as recited in claim 3 wherein said generating means comprises:

a flyback transformer including a primary winding in said primary circuit and including said secondary winding in said secondary circuit; and drive means in said primary circuit for producing said first and second high voltage outputs in said secondary circuit, said secondary winding having a high voltage end terminal and a low voltage end terminal.

5. A regulated high voltage supply as recited in claim 4 wherein said first correcting means comprises first means for varying the output of said drive means in response to said first error signal.

6. A regulated high voltage supply as recited in claim 5 wherein said second correcting means for correcting said second high voltage output for said fluctuations by setting said reference voltage for said secondary winding comprises means for varying the voltage of said low voltage end terminal in response to said second error signal.

* * * * *